Dec. 11, 1923.
M. O. HENDERSON
ANIMAL FEEDER
Filed Sept. 22, 1922
1,477,121
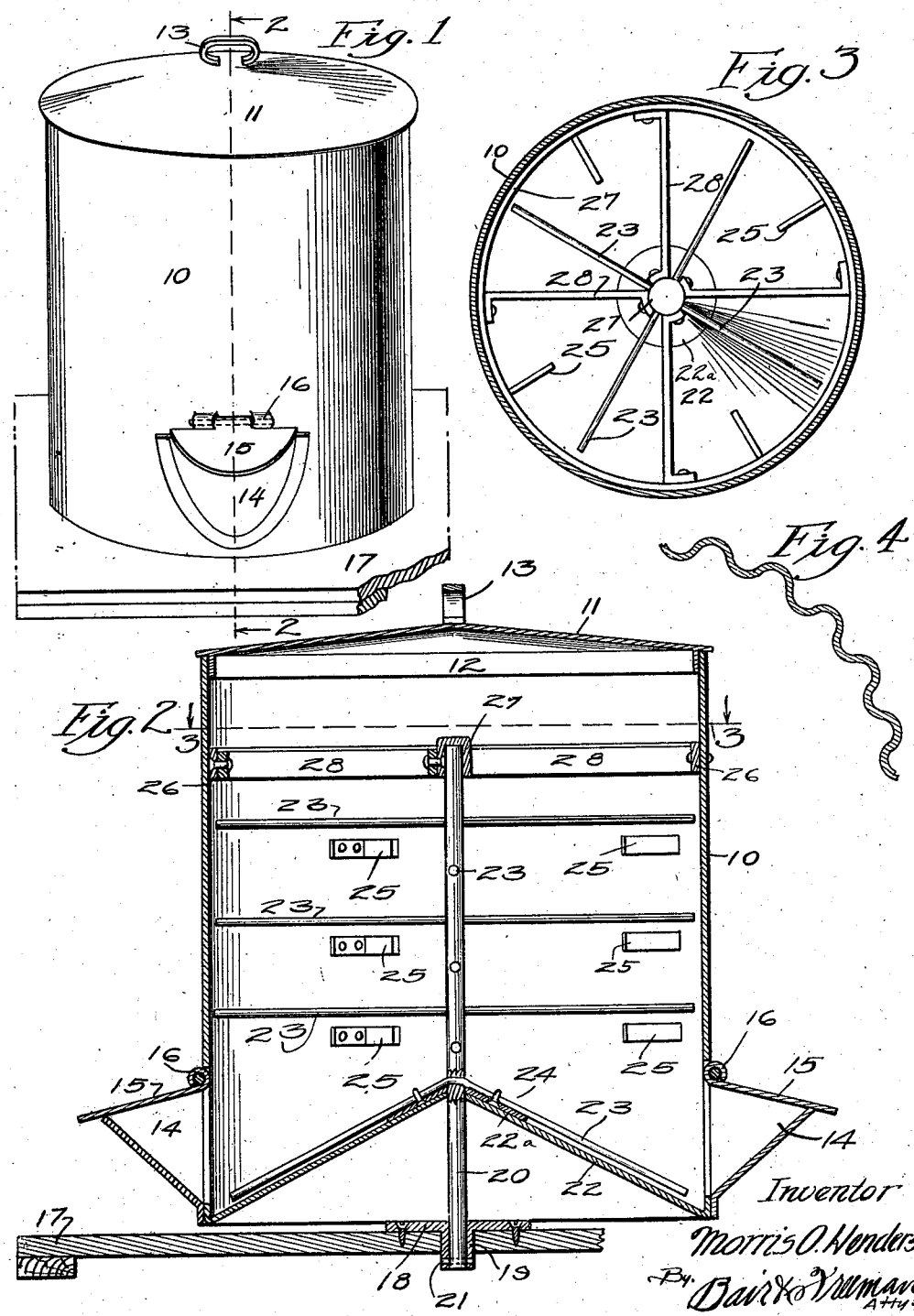

Patented Dec. 11, 1923.

1,477,121

UNITED STATES PATENT OFFICE.

MORRIS O. HENDERSON, OF STORY CITY, IOWA.

ANIMAL FEEDER.

Application filed September 22, 1922. Serial No. 589,905.

*To all whom it may concern:*

Be it known that I, MORRIS O. HENDERSON, a citizen of the United States, and a resident of Story City, in the county of Story and State of Iowa, have invented a certain new and useful Animal Feeder, of which the following is a specification.

The object of my invention is to provide a feeder of simple, durable and inexpensive construction, adapted for use in feeding chickens, hogs and other animals.

More particularly, it is my object to provide a feeder of the type in which a receptacle is provided for the feed and feeding troughs are provided into which the feed passes from the receptacle, for keeping up the supply in the troughs.

With some kinds of feeders, difficulty is incurred on account of the fact that the feed does not pass downwardly steadily and uniformly to the troughs and sometimes the troughs become empty until the farmer or other attendant stirs the feed or otherwise causes it to feed down.

It is therefore my object to provide a feeder, whereby the above-mentioned difficulties may be avoided and in which the receptacle is mounted for easy bodily movement, while fixed means are provided for causing the feed to be agitated when the receptacle is moved.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 shows a perspective view of an animal feeder embodying my invention.

Figure 2 shows a vertical, sectional view taken on the line 2—2 of Figure 1.

Figure 3 shows a horizontal, sectional view taken on the line 3—3 of Figure 2; and Figure 4 shows a horizontal, sectional view through a portion of a wall of a feeder receptacle made of corrugated metal and forming a slightly modified form of my invention.

In the accompanying drawings, I have used the reference numeral 10 to indicate the main body of a receptacle of a feeder, which may be in the form of a tank or cylinder.

The tank 10 has a cover 11, which overhangs the edge of the tank, as shown, and is provided with a downwardly extending flange 12 arranged to fit on the inside of the tank. The cover 11 has a handle 13.

At the bottom of the tank, I provide a plurality of feed troughs 14 communicating with the interior of the lower part of the tank. Above the troughs 14 are movable covers or lids 15, hinged as at 16 on the body of the tank above the said troughs.

Below the tank is a suitable supporting base 17 on which I mount a plate 18 which has a downwardly projecting sleeve 19 to receive and form a bearing for an upright shaft or rod 20, which is secured to the sleeve 19 by means of a pin 21.

The bottom of the tank is formed like an inverted cone 22. Above the cone 22 is a cover or cap 22ª which has the upright 20 extended therethrough. The cap is secured to the upright 20.

Mounted on the upright shaft or post or rod 20, I provide a plurality of arms or rods 23, extending radially from the post 20 and terminating near the wall of the tank 10, as shown in Figures 2 and 3.

The lowest rod 23 is bent downwardly and fastened to the cap 22ª in order to prevent its rotation with the shaft 20.

Suitably mounted on the interior of the wall of the tank 10 are inwardly projecting fingers or the like 25 designed to coact with the arms 23 for disturbing the feed in the tank.

In order to make a stronger construction to help keep the tank properly positioned, there is mounted on the interior thereof at about the level of the upper end of the shaft 20, an annular ring 26.

Rotatably mounted on the upper end of the shaft is a cap or bearing 27. Radially arranged arms 28 are secured to and connect the ring 26 and the cap 27, so that a bearing is thus provided for mounting the upper portion of the tank in proper position on the shaft 20.

It will be obvious that the tank is centered and held in position by the bearing 21 resting on the shaft 20.

In Figure 4, I have shown a wall 29 of a tank similar to the tank 10 with the exception that the wall 29 is made of corrugated sheet iron.

In the practical use of my improved animal feeder, the cover 11 is removed and the feed, such for instance as bran or shorts or otherwise, is poured into the tank 10.

The feeder is designed particularly for use in feeding hogs. The hogs soon learn to raise the covers 15 and as they jostle and move about, they rotate the tank slightly which causes the feed to be agitated and disturbed by the rods 23 and fingers 25 and member 22 for insuring the downward movement of the feed to the troughs 14.

The hogs will learn even to rotate the device a little to cause the contents of the tank to be fed down for supplying the troughs.

Some changes may be made in the construction and arrangement of the parts of my improved feeder without departing from the real spirit and purpose of my invention, and it is my intention to cover by my claims, any modified forms of structure or use of mechanical equivalents, which may be reasonably included within their scope.

It will be understood, of course, that my device may be made in any suitable size and that wood or metal or any suitable materials may be used for the parts.

I claim as my invention:

1. In an animal feeder, a base, a tubular container mounted for rotating on said base having an outwardly projecting trough at its lower portion, an upright fixed to said base and projected upwardly into said container radially projecting arms extending from said upright within the container, inwardly projecting elements on the inside of the container vertically spaced from the respective arms, a tapered member fixed to said upright in the lower part of the container, the parts being so arranged that the container may be rotated on said upright and on said base.

2. In an animal feeder, a base, a tubular container mounted for rotating on said base having an outwardly projecting trough at its lower portion, an upright fixed to said base and projected upwardly into said container radially projecting arms extending from said upright within the container, inwardly projecting elements on the inside of the container vertically spaced from the respective arms, a hollow cone-shaped member mounted on said upright in the bottom of the container, a rod projected through the upright adjacent to the upper end of said last member and secured to said last member, whereby the cone-shaped member is fixed with relation to the upright.

Des Moines, Iowa, July 28, 1922.

MORRIS O. HENDERSON.